United States Patent Office 3,068,190
Patented Dec. 11, 1962

3,068,190
CONDENSATION OF ALDEHYDES WITH TRIAZ-INYL ARYL SULFONIC ACID DERIVATIVES AND PROCESS OF PREPARING SAME
Gaetano F. D'Alelio, South Bend, Ind., assignor, by direct and mesne assignments, to Dal Mon Research Co., Cleveland, Ohio, a corporation of Delaware
No Drawing. Filed Dec. 5, 1958, Ser. No. 778,290
16 Claims. (Cl. 260—45.2)

This invention relates to the production of new synthetic materials and especially to new products having utility in the coating, impregnating and plastic arts.

The new compositions of this invention comprise condensation products of ingredients comprising an aldehyde, including polymeric aldehydes, hydroxyaldehydes, and aldehyde-addition products, e.g., formaldehyde, paraformaldehyde, aldol, glucose, dimethylol urea, trimethylol melamine, etc., and a triazine derivative corresponding to the general formula

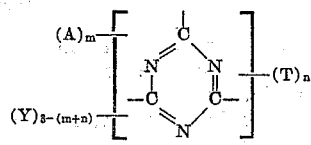

In the above formula, $n$ and $m$ are integers of at least one and no more than two, and the sum of $m$ and $n$ does not exceed three; A represents an aldehyde-reactable group; T represents an aryl sulfonic acid group; and Y represents any monovalent radical. In the above formula, it may be seen that when $n$ is one, $m$ can be one with one T group, or $m$ can be two with no T group; or if $n$ is two then $m$ is one and there will be no Y group; and when Y is one then $m$ and $n$ must each be one. The only requirement in this invention for the triazine derivative is that it have at least one aldehyde-reactable group A and at least one T group. For purposes of simplicity, the trivalent 1,3,5-triazine or symmetrical triazine nucleus is sometimes represented hereinafter by $C_3N_3$.

The aldehyde-reactable group, is a grouping of atoms or radicals that react with aldehyde or polymeric-aldehydes to form a derivative such as illustrated by the following:

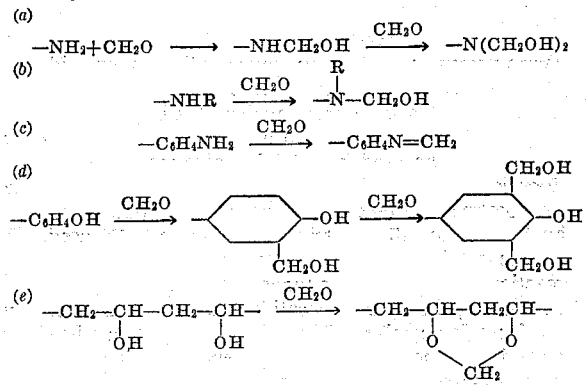

As illustrative examples of the aldehyde-reactable group, A, there are mentioned the following groups:

—S—(CR$_2$)$_x$—$\overset{\overset{\text{Y}}{\|}}{\text{C}}$—NHR, as disclosed in my U.S. Patent 2,295,562, issued September 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

—NR—NR$\overset{\overset{\text{Y}}{\|}}{\text{C}}$—NHR, as disclosed in my U.S. Patent 2,295,565, issued September 15, 1942, wherein Y represents a member of the class consisting of hydrogen and monovalent hydrocarbon and halohydrocarbon radicals;

—NR$\overset{\overset{\text{Y}}{\|}}{\text{C}}$—NHR, as disclosed in my U.S. Patent 2,312,688, issued March 2, 1943, wherein Y represents a member of the class consisting of oxygen and sulfur and R represents a member of the class consisting of hydrogen and hydrocarbon radicals and halohydrocarbon radicals;

—SC$_n$R$_{2n}$$\overset{\overset{\text{Z}}{\|}}{\text{C}}$—NR—Y—SO$_2$NHR, as disclosed in my U.S. Patent 2,312,690, issued March 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

—NR—Z—SO$_2$NHR, as disclosed in my U.S. Patent 2,312,697, issued March 2, 1943, wherein Z represents an aryl nucleus and R represents a member of the class consisting of hydrogen and monovalent hydrocarbon radicals and substituted hydrocarbon radicals;

—SC$_n$R$_{2n}$$\overset{\overset{\text{Z}'}{\|}}{\text{C}}$—NR—Y—OH, as disclosed in my U.S. Patent 2,312,700, issued March 2, 1943, wherein $n$ represents an integer and is at least one and not more than 2, Z' represents a member of the class consisting of oxygen and sulfur, Y represents a divalent carbocyclic radical and R represents a member of the class consisting of hydrogen and monovalent hydrocarbon radicals and substituted hydrocarbon radicals;

—NHR, as disclosed in my U.S. Patent 2,335,846, issued December 7, 1943, wherein R represents a member of the class consisting of hydrogen and monovalent hydrocarbon radicals and halohydrocarbon radicals;

—Z—CONHR, wherein Z represents a divalent hydrocarbon radical and R represents hydrogen and a monovalent hydrocarbon radical and substituted hydrocarbon radicals;

—B—Z—CONHR, wherein B represents a member of the class consisting of oxygen, sulfur and —NR, Z represents a divalent hydrocarbon radical and substituted hydrocarbon radicals, and R represents a member of the class of hydrogen and monovalent hydrocarbon radicals and substituted hydrocarbon radicals;

HNR—NR—, wherein R represents a member of the class consisting of hydrogen and monovalent hydrocarbon radicals and substituted hydrocarbon radicals;

HO—Z—, wherein Z represents a divalent aromatic radical and substituted hydrocarbon radicals as hereinabove defined. A few typical triazine compounds are (HO C$_6$H$_4$)(C$_3$N$_3$)$\left[\overset{\overset{\text{O}}{\|}}{\text{P}}(\text{O R})_2\right]_2$, $$(\text{HOC}_6\text{H}_4)_2(\text{C}_3\text{N}_3)-\overset{\overset{\text{O}}{\|}}{\text{P}}(\text{O R})_2, \text{ etc.}$$

HO—Z—NR—, wherein R represents hydrogen and monovalent hydrocarbon radicals and substituted hydrocarbon radicals, and Z represents a divalent aromatic radical and substituted hydrocarbon radicals as hereinabove described. A few typical compounds are $$(\text{HOC}_6\text{H}_4\text{NH})_2(\text{C}_3\text{N}_3)-\overset{\overset{\text{O}}{\|}}{\text{P}}(\text{OR})_2, \text{HOC}_6\text{H}_4\text{NH}(\text{C}_3\text{N}_3)\left[\overset{\overset{\text{O}}{\|}}{\text{P}}(\text{OR})_2\right]_2, \text{ etc.}$$

RCONHNR—, wherein R represents hydrogen and a monovalent hydrocarbon radical and substituted hydrocarbon radicals as previously defined hereinabove.

R$_2$NCY—NR—CHR'—, as disclosed in my U.S. Patent 2,339,623, issued January 18, 1944, wherein Y represents oxygen or sulfur, at least one R represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms; etc.

Thus it may be seen that A may be any aldehyde-reactable group.

In the above triazine derivative formula, Y can be R which represents hydrogen or any monovalent hydrocarbon radical, whether saturated or unsaturated, substituted or unsubstituted, aliphatic, carbocyclic, aryl or heterocyclic, mono- or poly-nuclear, etc. Examples of suitable hydrocarbon groups represented by R are aliphatic, aromatic, e.g., methyl, ethyl, propyl, isopropyl, butyl, secondary butyl, butenyl, amyl, hexyl, allyl, methallyl, cyclopentenyl, cyclohexyl, cyclohexenyl, phenyl, diphenyl, naphthyl, tolyl, xylyl, ethylphenyl, propylphenyl, isopropylphenyl, allylphenyl, benzyl, phenylallyl, phenylpropyl, etc. and their homologues, as well as those groups with one or more of their hydrogen atoms substituted by halogens, as, for example, fluorine, chlorine, nitro groups, nitroso groups, amino groups, carboxy groups, carbalkoxy groups, methoxy and aryloxy groups, mercapto groups, etc.; Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohol, etc., and these radicals are represented by RO—; Y can also be R—S— groups which are the mercapto equivalents to RO—; Y can also be —NR$_2$ that is, an amino group, a monosubstituted amino group or a disubstituted amino group, as for example, the radicals of methylamine, ethylamine, butylamine, nonylamine, benzyl amine, dimethyl amine, aniline, naphthylamine, ethanolamine, diethanolamine, diisopropylamine, methyl-aniline, piperidine, aminopyridine, and the hydrazine radicals, namely, R$_2$NNR— from hydrazine, unsymmetrical dimethyl hydrazine, symmetrical dimethyl hydrazine, trimethyl hydrazine, phenyl hydrazine; Y can also be the N-radicals of the amino-acids, the amino-esters, the amino-amides, and the amino-nitriles, specific examples of which are —NHCH$_2$COOH, —NCH$_2$COOCH$_3$, —N(CH$_2$)$_5$CON(CH$_3$)$_2$
       |                |
       CH$_3$           C$_2$H$_5$ —NHCH$_2$CN, —N—CH$_2$CN, —N—(CH$_2$)$_5$CN
              |            |
              CH$_3$       C$_2$H$_5$

—NHC$_6$H$_4$CN, —NHC$_6$H$_4$NHOCCH$_3$

Y can also be radicals of alkylene imines, such as, for example,

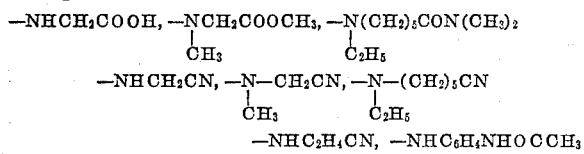

and the radicals of malonic esters and substituted malonic esters, nitriles, and amides, such as, for example, —CH(COOCH$_3$)$_2$, —CH(COOCH$_2$CH=CH$_2$)$_2$
—CH(CN)$_2$, —CH[CON(CH$_3$)$_2$]$_2$

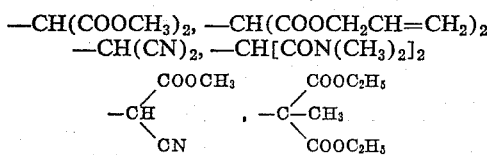

etc.; or Y can be the radical of another triazinyl ring, e.g., (CH$_3$NH)$_2$(C$_3$N$_3$)—, (HO)$_2$(C$_3$N$_3$)—, or the triazine ring can be attached through a bridge, such as

[(CH$_3$)$_2$N]$_2$(C$_3$N$_3$)—NHCH$_2$CH$_2$NH—
(C$_2$H$_5$NH)$_2$(C$_3$N$_3$)—OCH$_2$CH$_2$O—
(H$_2$N)$_2$)C$_3$N$_3$)—NHCH$_2$CH$_2$O— etc.; Y can also be chlorine, bromine, —CN, COOR, etc.; as well as A and T. Thus, it may be seen that a wide variety of modified triazines can be used in the practice of this invention.

T represents an aryl sulfonic acid group which is attached to the triazine nucleus either directly or through other atoms, such as through nitrogen, oxygen, sulfur, carbon, selenium, etc., such as, for example, —O—(CR$_2$)$_q$—Z—(SO$_3$H)$_p$
—NR—(CR$_2$)$_q$—Z—(SO$_3$H)$_p$, —(CR$_2$)$_q$Z—(SO$_3$H)$_p$
—NRZ—(SO$_3$H)$_p$, NR—Z(SO$_3$H)$_p$, —O—Z(SO$_3$H)$_p$,
—S—Z—(SO$_3$H)$_p$,

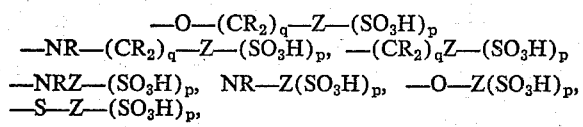

Se—Z—(SO$_3$H)$_p$, —NRNR—Z(SO$_3$H)$_p$, wherein R represents a member of the class consisting of hydrogen, monovalent hydrocarbon radicals and substituted hydrocarbon radicals, as previously described, Z represents a member of the class consisting of polyvalent aromatic hydrocarbon radicals and substituted aromatic hydrocarbon radicals, p represents a numerical value of one to three, and q a value of zero to six. These groups can be represented by the structure (B)$_r$—Z—(SO$_3$H)$_p$ wherein B represents —O(CR$_2$)$_q$—, —NR—(CR$_2$)$_q$—, —(CR$_2$)$_q$—, —NR, —O—, —Se—, —S—

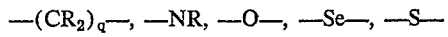

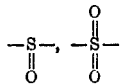

—NR—NR—, etc., r represents a value of 0 or 1, and p, q, and R are as previously defined, and (CR$_2$)$_q$ can also be a cycloaliphatic group.

Thus, alternately the triazine derivatives used in the practice of this invention are described by the formula

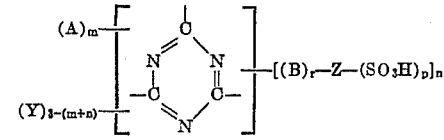

wherein A, Y, B, Z, m, n, p, and r have the meaning hereinabove given. The —SO$_3$H group represents not only the free acid but also its salts, such as the sodium, potassium, lithium, calcium, copper, chromium, ammonium, amine salts (e.g. ethanol amine, diethanol amine, isopropanol amine, polyethylene amine, aminophenol, etc.), hydrazine, protein, etc.

Illustrative examples of polyvalent aromatic radicals that Z represents in the above formula are phenylene, xenylene, naphthylene, etc.; the corresponding trivalent and tetravalent radicals, polyvalent aliphatic-substituted aromatic, e.g., 2,4-tolylene, ethyl-2,5-phenylene, isopropyl-3,4 - phenylene, 1 - butyl - 2,4 - naphthylene, diphenylene, phenoxyphenylene, phenoxynaphthylene, ethyl phenylene, etc., and their homologues, as well as those polyvalent radicals with one or more of their hydrogen atoms replaced by a substituent, e.g., acyl, alkyl sulfamyl, alkenyl hydroxy, cyano, alkoxy, aryloxyl, a —COOR group, etc. Specific examples of substituted polyvalent radicals that Z represents are chlorophenylene, chloronaphthylene, bromophenylene, chloroxenylene, chlorotolylene, ethoxyphenylene, acetophenylene, sulfamylphenylene, acetoxyphenylene, hydroxyphenylene, phenoxyphenylene, methylphenylene, allylphenylene, etc. Preferably Z represents a phenylene or a naphthylene radical, or the corersponding trivalent and tetravalent radicals.

In practicing this invention the initial condensation reaction can be carried out at normal or elevated temperatures, at atmospheric, subatmospheric, or super-atmospheric pressures, and under natural, alkaline, or acid conditions. Preferably, in most cases, the reaction between the components is initiated under alkaline conditions.

Any substance yielding an alkaline or an acid aqueous solution can be used in obtaining alkaline or acid conditions for the initial condensation reaction. For example, an alkaline substance such as soduim, potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-non-reactable nitrogen-containing basic tertiary compounds, e.g., tertiary amines such as trialkyl (e.g. trimethyl, triethyl, etc.) amines, or an aldehyde-reactable nitrogen-containing basic compound, for instance, ammonia, primary amines (e.g. ethyl-amine, propyl amine, etc.) and secondary amines (e.g. dipropylamine, dibutylamine, etc.) The secondary condensation catalyst, which ordinarily is used in an amount less than the amount of the primary catalyst, advantageously is a fixed alkali, for instance, a carbonate, cyanide, or hydroxide of an alkali metal (e.g. sodium, potassium, lithium, etc.)

Illustrative examples of acid condensation catalysts that can be employed are inorganic or organic acids, such as hydrochloric, sulfuric, phosphoric, acetic, lactic, acrylic, malonic, etc., or acid salts, such as sodium acid sulfate, monosodium phosphate, monosodium phthalate, etc. Mixtures of acids, of acid salts, or acids and acid salts can be employed, if desired.

The reaction between the aldehyde, e.g., formaldehyde, and the triazine derivative can be carried out in the presence of solvents, diluents, fillers, or other natural or synthetic resinous bodies, or while admixed with other materials that also can react with the aldehydic compound or with the triazine derivative, e.g., ketones, urea, thiourea, selenourea, iminourea (guanidine), substituted ureas, thioureas, selenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g. chloroacetamide), maleic monoamide, malonic monoamide, phthalic monoamide, maleic diamide, fumaric diaide, malonic diamide, itaconic diamide, succinic diamide, phthalic diamide, the monoamide, diamide and triamide of tricarballylic acid, etc.; aldehyde-reactable diazines compounds, such as are disclosed in my U.S. Patent 2,382,211, issued August 14, 1945; aminotriazines, e.g., melamine, ammeline, ammelide, melem, melon, etc.; phenol and substituted phenols, e.g., the cresols, the xylenols, the tertiary alkyl-phenols and other phenols, such as mentioned in my U.S. Patent 2,339,441; monohydric and polyhydric alcohols, e.g., butyl propylene glycol, pentaerythritol, polyvinyl alcohol, etc.; amines, including aromatic amines, e.g., aniline, etc. and the like. In such cases, the triazine derivative should represent 5–95% by weight of the aldehyde reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes and aldehyde-addition products, for instance, formaldehyde, paraformaldehyde, dimethylol urea, a polymethylol melamine; and thereafter reaction effected between this partial condensation product, and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble infusible state. The thermoplastic condensation products are of particular value as plasticizers for other synthetic resins. The thermosetting, or potentially thermosetting resinuous condensation products, alone or mixed with fillers, pigments, dyes, lubricants, plasticizers, curing agents, etc., can be used, for example, in the production of molding and laminating compositions. In other cases, they can be used as ion exchange resins and as tanning agents.

The liquid intermediate condensation products of this invention can be concentrated by the removal or, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies; as surface-coating materials in the production of paints, varnishes, lacquers, enamels, etc.; for general adhesive applications in producing laminated articles, and for other purposes. The liquid, heat-hardenable or potentially heat-hardenable condensation products also can be used directly as casting resins, while those which are of gel-like nature in the partially condensed state can be granulated and dried to form clear, unfilled heat-convertible resinous products.

In producing these new condensation products the choice of the aldehyde is dependent largely on economic considerations and upon the particular properties desired in the finished product. Preferred aldehydic reactants are formaldehyde and compounds engendering formaldehyde, e.g., paraformaldehyde, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes, (e.g., aldol, glucose, glycollic aldehyde, glyceraldehyde, etc.), mixtures thereof or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, particularly the mono- and polymethylol derivatives of urea, thiourea, selenurea, and iminourea, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines. Particularly good results are obtained with active methylene-containing bodies as a methylol urea, more particularly mono- and dimethylol ureas, a methylol aminotriazine, more particularly a methylol melamine, e.g., monomethylol melamine and polymethylol melamines (di-, tri-, tetra-, penta-, and hexamethylol melamines). Mixtures of aldehydes and aldehyde-addition products can be employed, e.g., mixtures of formaldehyde and methylol compounds, such, for instance, as dimethylol urea, trimethylol melamine, hexamethylol melamine, etc.

The ratio of the aldehydic reactant to the triazine derivative can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of the triazine derivative. When an aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 to 3 up to 15 to 20 or more moles of such alkylol derivatives for each mole of the triazine derivative.

As indicated hereinbefore, the properties of the fundamental resin can be varied widely by introducing other modifying bodies before, during, or after effecting condensation between the primary components. Thus, modifying agents that can be used include, for example, methyl, ethyl, propyl, isopropyl, isobutyl, hexyl, etc., alcohols; polyhydric alcohols, such as, for example, diethylene glycol, triethylene glycol, pentaerythritol, etc.; alcohol ethers, e.g., ethylene glycol monomethyl ether, ethylene glycol monoethyl ether, diethylene glycol monobutyl ether, etc.; amides, such as formamide, stearamide, acrylamide, benzene sulfonamides, toluene sulfonamide, the aryl disulfonamides, adipic diamide, phthalamide, etc.; amines, e.g., ethylene diamine, phenylene diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acylated ureas, more particularly halogenated acylated ureas of the kind described in my U.S. Patent 2,851,559, and others.

The modifying bodies also can take the form of high molecular weight bodies with or without resinous characteristics, for example, hydrolyzed wood products, formalized cellulose derivatives, lignin, protein-aldehyde condensation products, aminotriazine, aldehyde condensation products, aminotriazole-aldehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers, various reinforcing fillers, such as very finely ground clays, silica (e.g. Aerosil) wood flour, ground glass, mica, etc., can be compounded in accordance with conventional practice to provide various thermoplastic and thermosetting compositions.

The modified and unmodified condensation products have a wide variety of uses. They can be used as ion exchange resins in the conventional manner, or their copper or 8-hydroxyquinoline salts as wood preservatives, or as fertilizer additives, as for example, in the form of their iron or manganese salts, or as an additive to paper to increase its wet strength, or the calcium zinc, magnesium salts, etc., as molding compounds whereby they can also be used as modifiers for other natural and synthetic polymers, as for example, laminating varnishes in the production of laminated articles wherein sheet materials, e.g., paper, cloth, sheet asbestos, glass mats, and glass fibers, etc., are coated and impregnated with resin, superimposed and thereafter united under heat and pressure. They can be used in the production of baking enamels for bonding or cementing together mica flakes or for bonding together abrasive grains in the production of resin-bonded abrasive articles, such, for instance, as grindstones, sandpapers, emery cloths, etc., in the manufacture of electrical resistors, etc.

The condensation products of this invention are particularly useful in the treating and tanning of leathers. As is well known, resin tannage must be water-soluble or water dispersible and their solutions should tolerate a fair concentration of salt; they should be capable of penetrating into the skin before and during early stages of tanning and before and during the early stages of polymerization. Preferably, the tannage should be very pale or water-white in color. These objectives are readily achieved by the products of this invention. For example, the tolerance to salt solution, that is, the salting out value and the water solubility of the condensation products can be modified by varying the number of aryl sulfonic groups attached to the triazine ring, e.g.

$$(NH_2)(C_3N_3)(NHC_6H_4SO_3Na)_2$$

or $(NH_2)_2(C_3N_3)(NHC_6H_4SO_3Na)$, or by cocondensing with urea, melamine, dimethylol urea, dimethylol melamine, trimethylol melamine, phenol alcohols, etc., and by varying the ratio of such modifying cocondensing substances. Also, in accordance with the practice of this invention, the fat liquoring characteristic of the tannage can be readily modified by changing the values of R in the triazine derivative, for example, by using $$(C_8H_{17}NH)_2(C_3N_3)NHC_6H_4SO_3H$$

and $C_8H_{17}NH(C_3N_3)(NHC_6H_4SO_3H)_2$, instead of $$(NH_2)_2(C_3N_3)(NHC_6H_4SO_3H)$$

and $NH_2C_3N_3(NHC_6H_4SO_3H)_2$. Furthermore, the solubility or dispersibility of the condensation product can be increased by using as Y groups, those groups that increase solubility, such as $H(OCH_2CH_2)_nO-$ where $n$ has a numerical value from one to 50 or more. Also, the tanning compounds of this invention can also be modified so that they are act as preservatives, not only for leather but for such substances as wool, cotton, wood, paper, etc., by introducing into the triazine nucleus such groups as $-NHC_6H_4AsO_3H_2$, $-NHC_6H_4As=O$, $NHC_6H_4AsCl_2$, etc.

Among the triazine derivatives embraced by the formulas of the various classes of compounds used in producing the new condensation products of this invention are the triazines having the substituents indicated by the groups attached to the structure

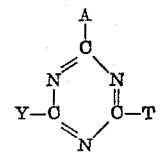

in the following table.

| Substituent A | Substituent Y | Substituent T |
|---|---|---|
| $-NH_2$ | $-NH_2$ | $-NHC_6H_4SO_3H$ |
| $-NH_2$ | $-NHC_6H_4SO_3H$ | $-NHC_6H_4SO_3H$ |
| $-NH_2$ | $-NHC_2H_5$ | $-N(CH_3)-C_6H_4SO_3H$ |
| $-NHC_6H_5$ | $-NH_2$ | $-NHNHC_6H_4SO_3H$ |
| $-NHCH_3$ | $-NHCH_3$ | $-OC_6H_4SO_3H$ |
| $-NH_2$ | $-Cl$ | $-NHC_6H_4SO_3H$ |
| $-NH_2$ | $-OH$ | $-NHC_6H_3(SO_3H)_2$ |
| $NH_2OCCH_2S-$ | $NH_2OCCH_2-S-$ | $-NHC_6H_3(CH_3)(SO_3H)$ |
| $NH_2CONHNH-$ | $NH_2CONHNH-$ | $-NHC_6H_4SO_3H$ |
| $HOC_6H_4NH-$ | $HOC_6H_4NH-$ | $-OC_6H_3(SO_3H)(CH_3)$ |
| $HOC_6H_4S-$ | $HOC_6H_4NH-$ | $-OC_6H_3(Cl)(SO_3H)$ |
| $NH_2CONH-$ | $HOC_6H_4S-$ | $-OC_6H_4C_6H_4SO_3H$ |
| $H_2NSO_2C_6H_4NH-$ | $-OC_6H_4CH_2CH=CH_2$ | $-NHC_6H_4C_6H_4SO_3H$ |
| $H_2NSO_2C_6H_4NH-$ | $-N(CH_2)(CH_2)$ | $-NHC_6H_5SO_3Na$ |

| Substituent A | Substituent Y | Substituent T |
|---|---|---|
| H₂NSO₂C₆H₄O— | —N(CH₂CH₂)₂O (morpholino) | —NHC₆H₃C₆H₄SO₃H |
| H₂NSO₂C₆H₄S— | —OCH₂CH₂OH | —NHC₆H₄SO₂H (CH₃ substituent) |
| CH₃CONHNH— | —S—C₆H₅ | —NHC₆H₄SO₂H |
| NH₂—C=N, N, H₂N—C=N, C—NHNH— (melamine-NHNH) | —HNCH₂CH₂CN | —OC₆H₃(OH)SO₃H |
| NH₂—C=N, N, H₂N—C=N, C—NHNH— | —CH₂COOCH₃ | —OC₆H₃(OH)(SO₃H) |
| NH₂—C=N, N, NH₂—C=N, C—NHNH— | —CH(COOC₂H₅)₂ | —OC₆H₄SO₃H |
| —NH—C₆H₃(OH)₂ (dihydroxyphenylamino) | —NH—C₆H₃(OH)₂ | —O—C₆H₄SO₃H |
| NH₂—C₃N₃—NH₂, NHCH₂CH₂NH— | —N(C₆H₁₁)₂ | —NH—C₁₀H₆SO₃H (naphthyl) |
| NH₂—C₃N₃—NH₂, NHCH₂CH₂NH— | —N(CH₃)—C₆H₄NO₂ | —NH—C₆H₄—C₆H₄SO₃H |
| NH₂—C₃N₃—NH₂, NHCH₂CH₂NH— | —C₆H₅ | —O—C₆H₄SO₃H |
| NH₂— | —N(CH₂CH=CH₂)₂ | —NH—C₆H₃(SO₃H)(OH) |
| NH₂— | —C₆H₄COOC₂H₅ | —NH—C₆H₄—O—C₆H₄SO₃H |
| NH₂— | —N(CH₃)—C₁₀H₇Cl | —HN—C₆H₄—NH—C₆H₄SO₃H |
| CH₃NHO₂SC₆H₄NH— | —OCH₂CH₂O—C₃N₃[N(CH₃)₂]₂ | —HN—C₆H₄—CH=CH—C₆H₄SO₃H |
| H₂NOC(CH₂)₅NH— | —P(O)(OCH₂—CH=CH₂)₂ | —HN—C₆H₄—S—C₆H₄SO₃Na |
| NH₂CONHNHOCCH₂— | —OCH₂CH—CH₂ (epoxide) | —NH—C₆H₄—SO₂—C₆H₄SO₃Na |
| H₂NOCCH₂O— | —NHCH₂—CH—CH₂ (epoxide) | —NHC₆H₄SO₃Na |
| H₂NOC\CH—, H₂NOC/ | —HNC₆H₄SO₂NH₂ | —NHC₆H₄SO₃H |
| (H₂NO₂S)₂C₆H₃NH— | —HNC₆H₄SO₂NHCONH₂ | —NHC₆H₄SO₃H |
| H₂HO₂SC₆H₄NH— | —SCH₂CONHCH₃ | —NHC₆H₄SO₃H |
| —NH₂ | —NH₂ | —NHC₆H₄SO₃Na |
| —NH₂ | —NHC₆H₄SO₃H | —NHC₆H₄SO₃K |
| —NH₂ | —NHC₂H₅ | —N(CH₃)—C₆H₄SO₃Li |
| —NHC₆H₅ | —NH₂ | —NHNHC₆H₄SO₂CaOH |

| Substituent A | Substituent Y | Substituent T |
|---|---|---|
| —NHCH₃ | —NHCH₃ | [—OC₆H₄SO₃]₂Ca |
| —NH₂ | —Cl | [—NHC₆H₄SO₃]₃Cr |
| —NH₂ | —OH | —NHC₆H₃(SO₃Cu)₂ |
| NH₂OCCH₂S— | NH₂OCCH₂—S— | —NHC₆H₃(CH₃)(SO₃NH₄) |
| NH₂CONHNH— | NH₂CONHNH— | —NHC₆H₄SO₃NH(C₂H₅OH)₃ |
| HOC₆H₄NH— | HOC₆H₄NH— | —OC₆H₃(SO₃K)(CH₃) |
| HOC₆H₄S— | HOC₆H₄NH— | —OC₆H₃(Cl)SO₃NH(C₃H₇OH)₃ |
| NH₂CONH— | HOC₆H₄S— | —OC₆H₄C₆H₄SO₃K |
| H₂NSO₂C₆H₄NH— | —OC₆H₄CH₂CH=CH₂ | (—NHC₆H₄C₆H₄SO₃)₂Ca |
| H₂NSO₂C₆H₄NH— | —N(CH₂)(CH₂) (aziridine) | —NHC₆H₄SO₃NH₃C₆H₅OH |
| H₂NSO₂C₆H₄O— | —N(CH₂CH₂)(CH₂CH₂)O (morpholine) | (—NHC₆H₃C₆H₄SO₃ with CH₃)₃Cr |
| H₂NSO₂C₆H₄S— | —OCH₂CH₂OH | (—NHC₆H₄SO₃)₂NH₃NH₃ |
| CH₃CONHNH— | —S—C₆H₅ | —NHC₆H₄SO₃NH₃C₂H₅OH |
| melamine-NHNH— | —HNCH₂CH₂CN | —OC₆H₃(OH)SO₃NH₂(C₂H₅OH)₃ |
| melamine-NHNH— | —CH₂COOCH₃ | —OC₆H₃(OH)(SO₃NH₃C₃H₇OH) |
| H₂NO₂SC₆H₄NH— | —O—(CH₂)₄CONHC₆H₄OH | —NHC₆H₄SO₃H |
| H₂NO₂SC₆H₄NH— | —O(CH₂)₄CONHCH₂CH₂OH | —NHC₆H₄SO₃H |
| —P(=O)(OC₂H₅)(NH₂) | —P(=O)(OC₆H₅)₂ | —NHC₆H₄SO₃H |
| —P(=O)(OC₂H₅)(NHC₆H₅) | —P(=O)(NHC₆H₅)₂ | —NHC₆H₄SO₃H |

The triazine derivatives used in practicing this invention conveniently can be prepared by condensing the corresponding halotriazines, e.g., the chlorotriazines etc., with an aryl aminosulfonic acid or with a hydroxyarylsulfonic acid in the presence of a hydrohalide acceptor such as sodium hydroxide, sodium carbonate, etc., for example, (1) $(A)_2(C_3N_3)Cl + NH_2-aryl-SO_3H \longrightarrow$
$(A)_2(C_3N_3)NH-aryl-SO_3H$ and $(A)_2(C_3N_3)Cl + HO-aryl-SO_3H \longrightarrow (A)_2(C_3N_3)O-aryl-SO_3H$ or (2) $\underset{(Y)}{\overset{(A)}{>}}(C_3N_3)Cl + NH_2-aryl-SO_3H \longrightarrow$
$\underset{(Y)}{\overset{(A)}{>}}(C_3N_3)-NH-aryl-SO_3H$ or (3) $(A)(C_3N_3)Cl_2 + 2NH_2-aryl-SO_3H \longrightarrow$
$(A)(C_3N_3)(NH-aryl-SO_3H)_2$ wherein A and Y are as previously defined, $(C_3N_3)$ represents the 1,3,5-triazine ring, and aryl represents divalent aromatic nucleus. The reaction can be further generalized by the use of the reactant T—H wherein T is as previously defined and H is an active hydrogen atom attached to the T group, e.g.

(1) $(A)_2(C_3N_3)Cl + TH \longrightarrow A_2(C_3N_3)T$ or (2) $(A)(C_3N_3)Cl_2 + 2TH \longrightarrow A(C_3N_3)(T_2)$ or (3) $\underset{(Y)}{\overset{(A)}{>}}C_3N_3)(Cl) + TH \longrightarrow \underset{(Y)}{\overset{(A)}{>}}(C_3N_3)-T$ Some specific examples of the above reactions are (1) $(NH_2)_2(C_3N_3)Cl + NH_2C_6H_4SO_3H \xrightarrow{2NaOH}$
$(NH_2)_2(C_3N_3)NHC_6H_4SO_3Na$ (2) $NH_2(C_3N_3)Cl_2 + 2NH_2C_6H_4SO_3H \xrightarrow{4NaOH}$
$NH_2(C_3N_3)(NHC_6H_4SO_3Na)_2$ (3) $\underset{HO}{\overset{NH_2}{>}}(C_3N_3)Cl + NH_2C_6H_4SO_3H \xrightarrow{2NaOH}$
$\underset{HO}{\overset{NH_2}{>}}(C_3N_3)NHC_6H_4SO_3Na$ Alternately, these compounds can be prepared by using a halotriazine containing an aryl sulfonic acid substituent and reacting it with a compound containing a reactive hydrogen, represented by MH, wherein M represents Y or A groups as defined above, for example, (1) 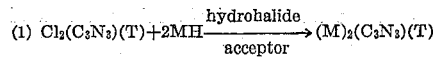

(2) 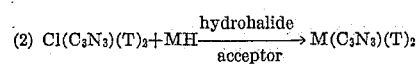

or, as an illustration:

(1a) 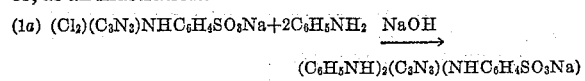

or (2a) 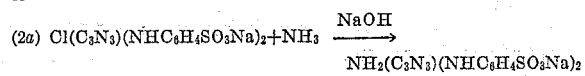

Illustrative examples of MH compounds are the alcohols such as $CH_3OH$, $C_2H_5OH$, $(CH_3)_2CHOH$, $C_4H_9OH$, $C_{12}H_{25}OH$, etc., the cycloaliphatic alcohols such as cyclohexanol, cycloheptanol, cyclopentanol, etc., ammonia and the amines, e.g.,

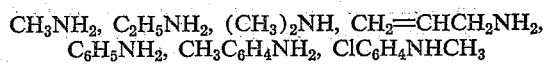

cyclohexylamine, etc., numerous examples of which are given in my copending application Serial No. 764,252, filed September 30, 1958.

The following examples illustrate the practice of this invention and are given by way of illustration and not by limitation. Parts and percentages recited herein, unless otherwise specified, are parts by weight and percent by weight.

*Example I*

In a suitable reactor equipped with a stirrer and reflux condenser, there is added 145.5 parts of 2,4-diamino-6-monochloro-1,3,5-triazine in 200 parts of water and the mixture heated to and maintained at a slow reflux. There is added slowly over a period of an hour a mixture of 170 parts of the sodium salt of paraminobenzene sulfonic acid and 40 parts of NaOH in 230 parts of water. The reaction is continued for 5-8 hours, after which the mixture is allowed to cool to room temperature. There is obtained an almost quantitative yield of $(NH_2)_2(C_3N_3)(NHC_6H_4SO_3Na)$ Upon the addition of 49–50 parts of 10% $H_2SO_4$ to the above solution, there is obtained the free triazinyl sulfonic acid derivative of the formula $(NH_2)_2(C_3N_3)(NHC_6H_4SO_3H)$ which, after drying, gives on analyses 29.5% nitrogen, 3.51% hydrogen, 37.46% carbon, 11.63% sulfur, and a molecular weight of 282.2, which values are in close agreement with the theoretical.

When 165 parts of the monoamino-dichlorotriazine are reacted instead of the monochlorotriazine with 340 parts of the sodium salts of para-amino-sulfonic acid and 80 parts of NaOH, there is obtained $NH_2(C_3N_3)(NHC_6H_4SO_3H)_2$ which on analyses gives values of 19.0% nitrogen, 3.21% hydrogen, 41.06% carbon, 14.42% sulfur, and a molecular weight of 436.7, which values are in close agreement with the theoretical values.

When the other halotriazines of the formula $(A)_2(C_3N_3)Cl$, or $(A)(C_3N_3)(Cl_2)$, or

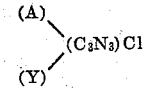

are used instead of the specific mono- and dihalotriazines of this example, then, the corresponding derivative is obtained. Likewise when other sulfonic acids corresponding to the formula T—H are used, then the corresponding sulfonic acid derivatives are obtained. In a similar manner the triazino-halogeno-compounds of the formula $(T)(C_3N_3)Cl_2$ and $(T)_2(C_3N_3)Cl$ are used to prepare the triazine derivatives of this example.

*Example II*

| | Parts |
|---|---|
| $(NH_2)_2(C_3N_3)NHC_6H_4SO_3H$ | 140 |
| Aqueous $CH_2O$ (37.5%) | 80 |
| NaOH in 100 parts $H_2O$ | 20 | are heated together under reflux at the boiling point of the mixture for 30–45 minutes yielding a viscous resinous dispersion which can be used directly as a tanning agent as shown in later examples, either as prepared or diluted to the desired concentration of solids. Also, it can be treated with sulfuric acid to liberate the resinous acid having free sulfonic group, which resin can be converted by heating to an insoluble, fusible product suitable as an ion exchange resin. Alternately, the sodium can be converted to other salts such as the calcium, copper, antimony, nickel, etc. by the addition of an aqueous solution of such a salt, e.g., copper sulfate, cupric chloride, ferrous acetate, etc. These metallated resins, e.g. the copper resinate, can be used with cellulosic fillers such as cotton, wood flour, alpha flock to prepare molding compounds which are fungus and mold-resistant. They can also be used as coating and impregnants for wood as wood preservatives, especially the copper and arsenic salts.

The specific resin of this example, particularly in the form of the polyethylene-imine salt, can also be used to impregnate paper and other fibrous sheet material and thereafter cured by heating to increase the wet strength of the paper. Paper impregnated with the resin in its acid form can be used for the separation and identification of organic bases using the standard paper-chromatography techniques. For these and other uses, this resin can be modified as shown in subsequent examples.

*Example III*

| | Parts |
|---|---|
| $NH_2(C_3N_3)(NHC_6H_4SO_3H)_2$ | 442 |
| Aqueous formaldehyde (37.5% $CH_2O$) | 120 |
| NaOH in 200 parts $H_2O$ | 80 | are refluxed for 2 hours to produce a condensation product especially suitable as a tanning agent as such or as diluted to the desired concentration.

This specific condensation product contains two sulfonic groups for each triazine ring and therefore can be reacted in part with other metals such as copper and still retain good dispersibility in water and related solvents. Instead of using the triazine derivatives of Examples II and III alone, a mixture of such derivatives can be used to produce a wide variety of condensation products varying from one sulfonic group to two sulfonic groups per triazine ring in the condensation product.

*Example IV*

In a reaction flask equipped with a stirrer and reflux condenser are mixed

| | Parts |
|---|---|
| $(NH_2)_2C_3N_3(NHC_6H_4SO_3H)$ | 140 |
| Formaldehyde (37.5% solution) | 80 |
| Water | 70 |

The mixture heated to 90° C. for 1 hour thereafter is cast into a shallow container and heated in an oven until the product is dry and hard. The product is then ground, washed with distilled water and redried. The resulting acidic ion exchange resin absorbs about 89.91% of the calculated amount of NaOH from a 5% NaOH solution and then exchanges the sodium ion for calcium, magnesium, copper, silver ions, etc., upon treatment respectively with solutions containing such ions.

This condensation product can be modified by cocondensing the triazine derivative and the aldehyde with other aldehyde reactable substances, including those that have ion exchange resin groups, e.g., urea, melamine, phenol, phenolsulfonic acid, etc. An amphoteric ion exchange resin is readily prepared by using a triazine having a multiplicity of groups having ion exchange properties, e.g., a triazine having both a sulfonic group and an amine group, e.g., $(NH_2)(C_3N_3)(NHC_6H_4SO_3H)$ $(NH\text{-pyridyl})$

Example V

Fifty pounds of pickled sheepskins are placed in a drum with 100 pounds of 5% salt solution and the drum is rotated. There is then added 39 pounds of the condensation product of Example II, three portions of 13 pounds each at one-half hour intervals, and the drumming continued for 6–8 hours. The skins are then allowed to lie in the liquor for 8–10 hours and then drummed for another one-half hour, after which the skins are drained and washed thoroughly, set out, crusted, and finished by the ordinary methods with excellent results. In a similar manner kid skins, pig skins, calf skins, snake skins, deer skins, bear skins, alligator skins, shark skins, etc., are tanned.

The tanning agents of this invention can also be used as a supplementary tannage, for example, for skins that have been given a preliminary chrome or alum tannage, or they can be used in conjunction with other natural or synthetic tannages, as for example:

A. Fifty pounds of chrome tanned kidskins at the end of tannage and before being dried out are added to 50 pounds of water in a rotating drum together with 8 pounds of the condensation product of Example II. The drumming is continued for 2 hours after which the skins are washed thoroughly, fat-liquored, set out, crusted, and finished by the ordinary finishing methods with excellent results.

B. Fifty pounds of alum tanned calfskins are given a supplementary, excellent tanning using 10 pounds of the condensation product of Example II, using the procedure used for tanned kidskins.

Instead of the condensation product of Example II, the condensation products of Examples VI to XVI inclusive, respectively, are also used in the above procedures to produce light colored tanned leather which shows high shrink temperatures.

Instead of using the condensation products alone, the products of this invention can be used with other natural and synthetic tanning agents for example, by using mixtures of liquid quebracho extract with the condensation products of this example. For example, 100 pounds of pickled pig-skins are treated with 40 pounds of a mixture of equal parts of liquid quebracho extract and the condensation product of Example II, in 300 pounds of a 5% salt solution in a rotating drum. Ten pounds of the tanning mixture are added in four equal feeds at intervals of about one-half hour and the drum continued for an additional 4–5 hours, after which the skins are allowed to remain in the liquor for 1–2 hours, then drummed for an additional hour. At the end of the drumming period, the hides are washed thoroughly, fat-liquored, set out, crusted, and finished in the ordinary method with excellent results.

Instead of the quebracho extract used above, synthetic tanning agents can be used, such as the reaction products of aromatic sulfonic acids and aldehydes, for example, phenol-sulfonic acid and formaldehyde. A typical preparation is as follows: to 94 parts of phenol are added slowly 150 parts of 66° Baumé sulfuric acid at room temperature, and upon completion of the addition of the acid, the temperature is raised slowly to 90–100° C. and reacted for 2 hours, after which 70 parts of water and 60 parts of 38% formaldehyde are added and the temperature maintained at 75–85° C. for one hour. The solution is then cooled, the excess sulfuric acid neutralized with sodium hydroxide, and then diluted with water to a 45–47% solids content for use in tanning mixtures containing the condensation products of this invention. Alternately, the aromatic sulfonic acid can be condensed with an aldehyde, for example, phenol sulfonic acid and formaldehyde, initially together with the triazine derivatives of this invention to produce tanning agents with improved color over corresponding aromatic-aldehyde compositions in which the triazine derivatives have been omitted, e.g.:

Ninety-four parts of phenol is heated to 35° C., 150 parts of 66° Baumé sulfuric acid is added slowly, and the temperature raised to 90–100° C. and maintained at this temperaure for 2 hours. Seventy parts of water are then added together with 15 parts of $(NH_2)_2(C_3N_3)NHC_6H_4SO_3H$ and 65 parts of 38% formaldehyde solution and the reaction continued for 2 hours. The solution is then cooled, the excess mineral acid neutralized with sodium hydroxide and the resulting solution diluted to the desired strength. This solution is used directly as a tanning agent as shown hereinabove.

Example VI

A sample of pickled split steerhide is depickled, brought to its isoelectric point and dehydrated by immersion in 3 changes of acetone. Twenty parts of the dehydrated hide is treated with a solution comprising 10 parts of the butylated resin prepared by reacting together under reflux for 1 hour

|  | Moles |
|---|---|
| $(NH_2)_2(C_3N_3)(NHC_6H_4SO_3H)$ | 1.00 |
| $CH_2O$ (38%) | 2.25 |
| Butyl alcohol | 30.00 | after which the mixture is neutralized with ethanol amine, followed by dehydration to remove water and diluted to the desired concentration. When the triazine derivative is intercondensed with formaldehyde and a polyhydric alcohol, e.g. glycerine, sorbitol, etc., a water soluble condensation product is obtained which produces a softer tanned leather.

Example VII

|  | Parts |
|---|---|
| $(NH_2)_2(C_3N_3)NHC_6H_4SO_3H$ | 120 |
| p-Toluene sulfonamide | 51 |
| Aqueous $CH_2O$ (37.5%) | 190 |
| NaOH in 50 parts $H_2O$ | 17 |

The above ingredients are refluxed for one-half hour to produce a syrup which has a slow cure. The addition of acids, such as sulfuric, phthalic anhydride, or of curing agents, such as chloroacetamide accelerates the cure.

Example VIII

|  | Parts |
|---|---|
| $NH_2(C_3N_3)(NHC_6H_4SO_3H)_2$ | 120 |
| Aqueous $CH_2O$ (37.5% $CH_2O$) | 190 |
| Phenol | 30 |

To the above mixture is added sufficient 20% NaOH solution to adjust the pH to 8–8.5 and the mixture refluxed for 1–2 hours to produce the condensation product.

Example IX

|  | Parts |
|---|---|
| Melamine | 50 |
| Aqueous $CH_2O$ (37.5% $CH_2O$) | 210 |
| NaOH in 10 parts $H_2O$ | 2 |

The above mixture is refluxed for thirty minutes and cures slowly on the hot plate at 120° C., but when 5 parts of $NH_2(C_3N_3)(NHC_6H_4SO_3H)_2$ are added to the syrup, a very rapid cure is obtained whereby the triazine derivative is intercondensed with the melamine-aldehyde reaction product.

Example X

| | Parts |
|---|---|
| $[(NH_2)_2C_3N_3(NHC_6H_4SO_3)]_2Cu$ | 80 |
| Dimethylol urea | 500 |
| $NH_3$ (in 2.5 parts $H_2O$) | 1 |
| $H_2O$ (distilled) | 500 |
| Ethyl alcohol | 200 |
| NaOH in 10 parts $H_2O$ | 0.6 | are refluxed together until a noticeable viscosity increase is observed. Then the mixture is cooled to room temperature and used with excellent results to impregnate soft-pine as a wood preservative.

Example XI

| | Parts |
|---|---|
| $(NH_2)_2(C_3N_3)OC_6H_4SO_3NH_4$ | 120 |
| Aqueous $CH_2O$ (37.5% $CH_2O$) | 210 |
| $NH_3$ (in 5 parts $CH_2O$) | 1 |
| Aqueous trimethylol melamine (50% solution) | 130 |

When the above mixture is refluxed for 20–30 minutes, a syrup is obtained which cures alone when heated to 100–130° C. on a hot plate.

Example XII

| | Parts |
|---|---|
| $(NH_2)_2(C_3N_3)OC_6H_4SO_3NH_4$ | 120 |
| Aqueous $CH_2O$ (37.5% $CH_2O$) | 150 |
| Glycerine | 20 | are mixed and refluxed for 30 minutes and the condensation products are used directly in the tanning of hides after dilution to the desired concentration.

Example XIII

| | Parts |
|---|---|
| $(NH_2)_2C_3N_3NHC_6H_4SO_3K$ | 120 |
| Aqueous $CH_2O$ (37.5% $CH_2O$) | 140 |
| Diethyl malonate | 20 |
| NaOH in 10 parts $H_2O$ | 0.2 | are refluxed for 20 minutes to produce a water-dilutable condensation product.

Example XIV

| | Parts |
|---|---|
| $(NH_2)_2C_3N_3NHC_6H_4SO_3Li$ | 120 |
| Aqueous $CH_2O$ | 140 |
| $NH_3$ (in 5 parts $H_2O$) | 1 |
| Acetamide | 15 |

The above ingredients are refluxed for 15 minutes to produce a clear syrup suitable as an impregnating composition.

Example XV

| | Parts |
|---|---|
| $(CH_3NH)_2C_3N_3NHC_6H_4SO_3K$ | 60 |
| Aqueous formaldehyde (37.5% $CH_2O$) | 80 |
| Polyvinyl alcohol (in 50 parts $H_2O$) | 5 | are refluxed for 30 minutes to produce a clear syrup which can be used for tanning of hides or as a mordant for wool, silk, or cotton, and as an impregnant for paper, wood, etc.

Example XVI

| | Parts |
|---|---|
| 1-phenyl guanazole | 35 |
| Aqueous formaldehyde (37.5%) | 32.4 |
| Ammonia | 1.2 |
| Aqueous NaOH (0.5 N) | 0.75 |
| Lead salt of reaction product of Example I | 9 | are mixed together, refluxed for 10 minutes and then mixed with 30 parts of alpha flock, dried and molded at 130° C. to produce a hard, well-knit product.

Example XVII

| | Parts |
|---|---|
| Shellac | 50 |
| Calcium salt of product of Example I | 15 | are ground together and then heated together at 150° C. to produce a hard, infusible resin. This modified resin can be used as a mica binder.

Example XVIII

| | Parts |
|---|---|
| Alkyd resin (e.g. glyceryl phthalate) | 50 |
| Calcium salt of product of Example I | 15 |

The components are mixed together and heated to 130–150° C. and cures to a hard, infusible product which can be used as a mica binder.

The invention claimed is:

1. A composition of matter comprising the reaction product of a mass comprising an aldehyde and a triazine derivative having the formula:

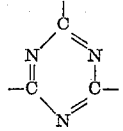

wherein at least one of said valencies is attached to an aldehyde-reactable group and at least one of said valencies is attached to a group containing an aromatic homocyclic nucleus having substituted thereon 1 to 3 groups selected from the class consisting of sulfonic acid radicals and sulfonated radicals in which the hydrogen of the sulfonic acid radical is replaced by a member selected from the class consisting of a metal, ammonium radical and amino radical, said aldehyde being reacted in an amount of about 1–8 moles per mole of triazine derivative, and said reaction being conducted at a temperature of at least room temperature.

2. A composition of claim 1, in which said mass also comprises melamine.

3. A composition of claim 1, in which said mass also comprises dimethylol urea.

4. A composition of claim 1, in which said mass also comprises a glyceryl phthalate resin.

5. A composition of claim 1, in which said aldehyde comprises formaldehyde.

6. A condensation product of an aldehyde and $$(NH_2)_2(C_3N_3)(NHC_6H_4SO_3H)$$

7. A condensation product of claim 6, in which said aldehyde is formaldehyde.

8. A condensation product of an aldehyde and $$NH_2(C_3N_3)(NHC_6H_4SO_3H)_2$$

9. A condensation product of claim 8, in which said aldehyde is formaldehyde.

10. A condensation product of an aldehyde and $$(CH_3NH-)_2C_3N_3-OC_6H_4SO_3H$$

11. A condensation product of an aldehyde and $$\underset{\underset{OH}{|}}{NH_2-C_3N_3-NHC_6H_3(SO_3H)_2}$$

12. A process for preparing resinous products comprising the step of reacting an aldehyde with a triazine derivative having the formula:

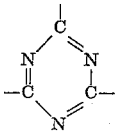

wherein at least one of said valencies is attached to an aldehyde-reactable group and at least one of said valencies is attached to a group containing an aromatic homocyclic nucleus having substituted thereon 1 to 3 groups selected from the class consisting of sulfonic acid radicals and sulfonated radicals in which the hydrogen of the sulfonic acid radicals is replaced by a member selected from the class consisting of a metal, ammonium radical and amino radical, said aldehyde being rected in an amount of about 1-8 moles per mole of triazine derivative, said reaction being conducted at a temperature of at least room temperature, and being catalyzed by an agent selected from the class consisting of alkaline and acidic aldehyde-condensation catalysts.

13. A process of claim 12, in which said aldehyde is formaldehyde.

14. A process of claim 13, in which said reaction is performed in a mixture also containing another aldehyde-reactable compound in addition to said triazine derivative.

15. A process of claim 14, in which said other aldehyde-reactable compound is melamine.

16. A process of claim 14, in which said other aldehyde-reactable compound is dimethylol urea.

References Cited in the file of this patent
UNITED STATES PATENTS
2,643,990    Ham  ---------------- June 30, 1953